(12) United States Patent
Vitsnudel

(10) Patent No.: US 8,031,952 B2
(45) Date of Patent: Oct. 4, 2011

(54) METHOD AND APPARATUS FOR OPTIMIZING MEMORY USAGE IN IMAGE PROCESSING

(75) Inventor: Ilia Vitsnudel, Even Yeuda (IL)

(73) Assignee: Broadcom Corporation, Irvine, CA (US)

( * ) Notice: Subject to any disclaimer, the term of this patent is extended or adjusted under 35 U.S.C. 154(b) by 698 days.

(21) Appl. No.: 12/106,729

(22) Filed: Apr. 21, 2008

(65) Prior Publication Data

US 2009/0262208 A1 Oct. 22, 2009

(51) Int. Cl.
*G06K 9/36* (2006.01)
*H04N 5/228* (2006.01)
*G06K 9/46* (2006.01)

(52) U.S. Cl. ..................... 382/232; 348/222.1
(58) Field of Classification Search ............... 382/164, 382/167, 173, 232, 233, 240, 250, 251, 274–276, 382/294, 304, 305, 307; 348/143, 222.1, 348/231.99, 340, E5.032, E5.051, E7.085, 348/E17.002; 375/E7.088, E7.103, E7.222; 345/629; 341/51, 107; 358/1.9, 504, 518
See application file for complete search history.

(56) References Cited

U.S. PATENT DOCUMENTS

| 4,647,950 | A | * | 3/1987 | Nosaki et al. | 347/246 |
| 4,729,038 | A | * | 3/1988 | Miura et al. | 358/300 |
| 5,583,500 | A | * | 12/1996 | Allen et al. | 341/107 |
| 5,717,394 | A | * | 2/1998 | Schwartz et al. | 341/51 |
| 2004/0109059 | A1 | * | 6/2004 | Kawakita | 348/143 |
| 2005/0099434 | A1 | * | 5/2005 | Gray et al. | 345/629 |
| 2005/0152596 | A1 | * | 7/2005 | Walmsley | 382/162 |
| 2007/0285554 | A1 | * | 12/2007 | Givon | 348/340 |
| 2009/0262208 | A1 | * | 10/2009 | Vitsnudel | 348/222.1 |
| 2010/0002100 | A1 | * | 1/2010 | Master et al. | 348/231.99 |

* cited by examiner

*Primary Examiner* — Amir Alavi
(74) *Attorney, Agent, or Firm* — McAndrews, Held & Malloy, Ltd.

(57) ABSTRACT

A method and digital camera avoiding the use of delay lines for block processing within the camera, such as compressing images, demosaicing, or the like. Processing is done for a block comprising a single newly received line, together with previously acquired information. In one preferred embodiment, the block processing is performed for the single line using previous lines as retrieved from the results of previous processing. In another embodiment, the processing results for the current block are determined by the processing results of the previous block together with the newly received line. Saving delay lines provides for lower memory requirements, and enables the production of smaller and lower cost cameras.

24 Claims, 4 Drawing Sheets

METHOD AND APPARATUS FOR OPTIMIZING MEMORY USAGE IN IMAGE PROCESSING

TECHNICAL FIELD

The disclosure relates to the field of electronic imaging in general, and to an apparatus and method for reducing memory requirements of digital cameras, in particular.

BACKGROUND OF THE INVENTION

Digital cameras and other image processing devices are being used nowadays ubiquitously throughout the world. Their popularity mainly stems from their relatively small size and low cost, which are due to the enabling technology.

A digital camera module usually comprises a sensor for acquiring the raw information, an image signal processing (ISP) unit for converting the raw signal into RGB pixel information ready to be displayed or compressed, and optionally a processing engine such as a compression engine for example to Joint Photographic Experts Group (JPEG) format. The sensor is preferably arranged in a matrix-like structure comprising lines and columns of sensor units. In common implementations the ISP unit and processing engine comprise a memory unit that stores the image part which undergoes processing, and a processing unit.

Modern devices store and use up to the last nine or more lines acquired by the sensor, referred to as delay lines, for providing the ISP with the image part for processing, and up to seven or more delay lines for providing the information for JPEG or any other compression engines. Since the image sizes keep increasing, in order to supply the required information to the engines, the memory requirements increase as well. This leads to a situation in which the memory unit constitutes a significant part of the camera module or other image processing engine, and induces increased size and cost.

Some methods exist for reducing the amount of on-chip memory used for the ISP and JPEG engines. One common method is to store the original image in an external memory unit and process the image in thin vertical stripes, for example 256 pixels wide, in order to decrease the length of on-chip delay lines. Thus delay lines constituting of 256 pixels are used and considerable amount of internal memory might be saved. However, this method has at least two limitations. The first limitation is that large external memory unit and memory bandwidth are not always available. Second, writing to and reading from the external memory require additional time, and significantly increase the minimal possible time between taken consecutive images. The time is further increased, since the memory has to be read twice, once for the ISP processing and once for the JPEG compression, if the internal delay lines are to be saved for JPEG compression after being processed.

Thus there is a need in the art for a method and apparatus for avoiding the usage of memory for storing delay lines, and thus minimize on-chip memory requirements. The method and apparatus should enable efficient processing of the raw information as captured by the sensor while avoiding the usage of an external memory unit for storing the information, and avoid increase in the size or price of the camera or other image processing device.

SUMMARY OF THE INVENTION

A method and apparatus for processing a pixel block, using no delay lines, or a reduced number of delay lines. The method and apparatus use a reconstruction of the previously processed lines, retrieved from previously processed pixel block, together with a newly captured line to perform pixel block processing. In another embodiment, the processing results rather than the reconstructed lines are used together with a newly captured line to perform the processing, thus providing pixel block processing results.

In a preferred embodiment of the disclosure there is thus provided a method for processing a pixel block, the method comprising the steps of: receiving data related to one or more previously captured image lines, the data differing from the previously captured image lines; receiving one or more captured pixels, the captured pixels belonging to one or more captured image lines; and processing the captured pixels and the data related to the previously captured image lines to obtain a processed block result. Within the method, the pixel block is optionally a rectangular pixel block. The method can further comprise a deprocessing step for deprocessing the processed block results to obtain one or more image lines. Within the method, the data related to the previously captured image lines is optionally a reconstruction of the image lines or an estimated reconstruction of the image lines. Within the method, the data related to the previously captured image lines optionally comprises a block processing result of an estimation of the image lines. The method optionally comprises a storing step for storing the block processing result. The method optionally comprises an error correction step for correcting an error in the image lines. Within the method, the processing step optionally comprises an item selected from the group consisting of: JPEG compression; JPEG 2000 compression; wavelet compression; MPEG compression; and demosaicing, and the deprocessing step comprises an item selected from the group consisting of: JPEG decompression; JPEG 2000 decompression; to wavelet decompression; MPEG decompression; and mosaicing. Within the method, the processing step is optionally JPEG compression, and JPEG coefficients are optionally determined by rotating previous JPEG coefficients, subtracting a normalized value of an outdated pixel and adding a normalized value of the captured pixel. The method is optionally performed in an image processing device, and optionally in a digital camera.

Another aspect of the disclosure relates to a method for processing a pixel block using a reduced number of delay lines, the method comprising the steps of: receiving data related to previously captured image lines from a processing unit; receiving a captured pixel, the captured pixel belonging to a captured image line; and processing the captured pixel and the data related to the previously captured image line to obtain a processed block result.

Yet another aspect of the disclosure relates to an image processing device for processing a pixel block, the device comprising: a memory unit comprising a delay line for storing an image line; a processor for executing a processing engine for processing a pixel block comprising the image line, from the delay line and from data related to previously captured image lines, for obtaining processed block results. Within the image processing device, the pixel block is optionally a rectangular pixel block. Within the image processing device, the processor further executes a deprocessing engine for deprocessing the processed block results to obtain an estimation to the previously captured image lines. Within the image processing device, the data related to previously captured image lines is optionally a reconstruction of the previously captured image lines, or an estimated reconstruction of the previously captured image lines, or a block processing result of an estimation of the previously captured image lines. The image processing device can further comprises a storage device for storing the block processing result. Within the image processing device, the processor can further execute error detection and correction in the image lines. Within the image processing device, the processing step optionally comprises an item selected from the group consisting of: JPEG compression; JPEG 2000 compression; wavelet compression; MPEG compression; and demosaicing. Within the image processing device, the deprocessing step optionally comprises an item selected from the group consisting of: JPEG decompression; JPEG 2000 decompression; wavelet decompression; MPEG decompression; and mosaicing. Within the image processing device, the processing step is optionally JPEG compression, and JPEG coefficients are optionally determined by rotating previous JPEG coefficients, subtracting a normalized value of an outdated pixel and adding a normalized value of the captured pixel.

Yet another aspect of the disclosure relates to a computer readable storage medium containing a set of computer instructions the set of computer instructions comprising: receiving data related to previously captured image lines, the data differing from the previously captured image lines; receiving one or more captured pixels, the captured pixels belonging to captured image lines; and processing the captured pixels and the data related to the previously captured image lines to obtain a processed block result.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are designated by the same numerals or letters.

DETAILED DESCRIPTION

Figure 1:
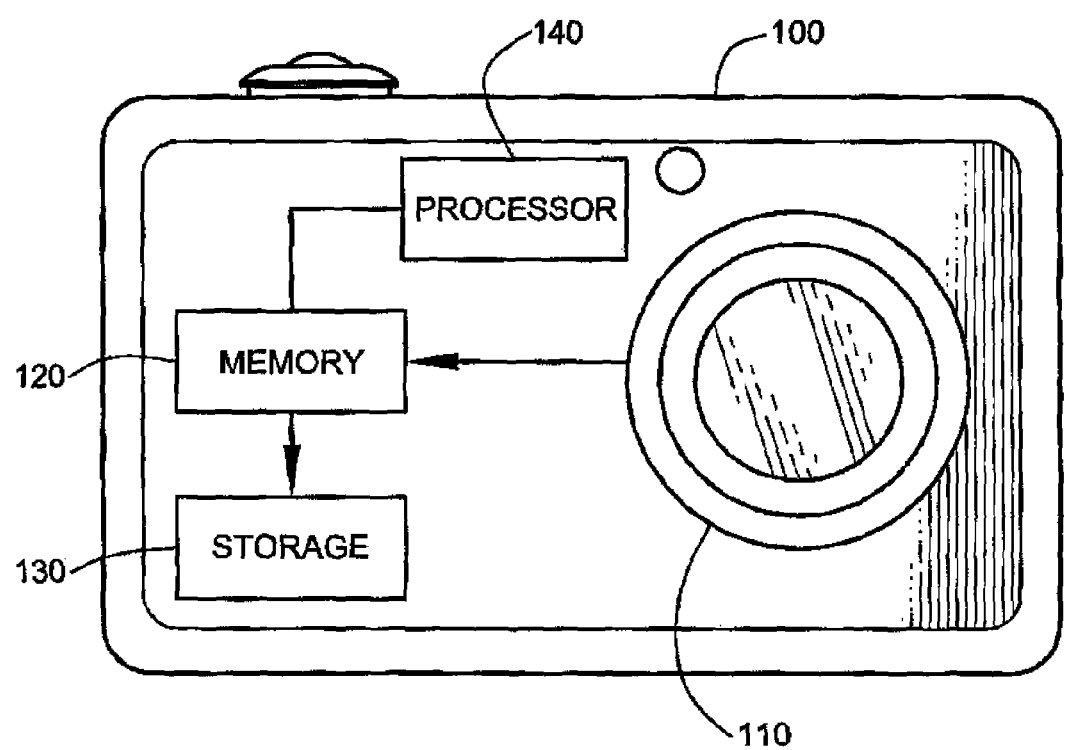
FIG. 1 is a schematic block diagram of a digital camera and the elements thereof, in accordance with the disclosure.

The disclosure relates to a method and apparatus for enabling a digital camera to perform various image processing tasks such as Demosaicing of raw sensor information, and Joint Photographic Experts Group (JPEG) format compression, or others without using delay lines, in order to reduce the on-chip memory requirements, and thus make the camera smaller and cheaper, while supplying required quality and speed performance of the camera.

Multiple types of processing, such as JPEG compression operate on a pixel block, such as an 8×8 pixel block, i.e. 8 pixels of each of 8 consecutive lines. Compressing the block into JPEG involves computing the Direct Cosine Transform (DCT) of the 8×8 pixels, followed by subsequent quantization and variable length encoding. The calculation is performed after the accumulation of eight, or another number of consecutive image lines, which are read into the delay lines. It will be appreciated that the disclosure is not limited to processing that requires a square N×N pixel block, but rather any N×M block size can be used.

In order to demonstrate the method, a compression processing utilizing eight-line blocks is used as an example, but a person skilled in the art will appreciate that the method is applicable to any processing, as long as the initial data or an approximation thereof can be retrieved form the processing results, such as JPEG compression, JPEG2000 compression, Wavelet compression, demosaicing or any other kind of image processing wherein the algorithm operates on a neighborhood of pixels With the disclosed method, compression is performed for every new line received, but no storage of the original information from the previous lines is required. After a set of compression results is created for a particular block, for example a set of Direct Cosine Transform (DCT) coefficients is generated, the results are stored in a data buffer. This storage requires significantly less memory space than that required prior to compression. Then, when a new line is received, the reverse action of the particular processing is performed, for example decompression, resulting in the same number of lines and pixels as were previously processed. The lines are significantly similar to the previously processed block. Out of the reconstructed lines, the one received earliest is abandoned, and the newly received line is added, so that a new block of the same size is available for processing. Thus, the previously received lines are not stored, but rather reconstructed by an operation inverse to the initial processing. The processed data is indeed stored, but for many processing methods, and in particular for compression methods, the amount of data is significantly smaller than the initial lines. In addition, the types of memory units usually used for the processed data are generally cheaper than the memory units used for delay lines.

For some types of processing, such as JPEG, JPEG 2000, Wavelet and other compressions, the method can be further enhanced, by providing the processing engine with its previously output data or reconstructed lines rather than original lines. Thus, the processing engine receives the processing results of the previous block, rather than the previous block itself (or an estimation thereof). The processing is then performed on the previous results together with the newly received line in a manner more efficient than ordinary processing. In all embodiments, the processing is performed on data related to previously captured lines, but the data may differ from the previously captured lines and be a product of processing the previously captured lines.

For making efficient JPEG compressions in the described above iterative manner, computing the new DCT coefficients from the previous DCT coefficients requires also the use of Direct Sine Transform (DST) coefficients of the previous pixel eight-tuple, which may initially seem wasteful and time-consuming. However, such an iterative computation is much more efficient than the ordinary calculation of the DCT coefficients. Further, once the DCT and DST coefficients are available, it is possible to estimate the motion between two consecutive images, and thus obtain MPEG compression for video streams without further computations.

Referring now to FIG. 1, showing an illustration of a camera and the elements thereof for implementing the disclosure. The camera, generally referenced 100, captures images via image capturing component 110, which may use a CCD sensor, a CMOS sensor, or the like, for capturing pixel value of one or more image lines. Alternatively, the incoming data may arrive from any other source of line-by-line image information such as the output of a video recorder, transmitted TV signal, broadcasted internet streaming video or any other origin. The camera captures sequences comprising one or more images. The camera further comprises memory 120, storage unit 130 and processor 140 for performing various processing and optionally their inverse processing on captured images, including for example demosaicing, JPEG compression, or the like. Processor 140 optionally comprises internal memory (not shown) for storing intermediate information. Image lines are transmitted from image capturing device 110 to memory 120, where they are stored and processed. After processing in memory 120, the image is stored on storage 130 or another permanent storage device, or sent to a viewing device (not shown) or to any other destination.

Memory 120, or the internal memory of processor 140 may also store coefficients from previous line processing. The processing is performed by processor 140, which may comprise multiple processors, or one processor performing multiple processing tasks. Processor 140 is preferably a computing platform such as a general purpose processor or a dedicated processor such as a special DSP processor frequently used in Digital Still Cameras (DSCs).

In preferred implementations of the disclosure, the internal memory of processor 140, or external memory 120 should be large enough to store the compressed signal of the 8 or more consecutive lines and does not have to store a multiplicity of rows, such as eight delay lines as used in prior art devices.

It will be appreciated by a person skilled in the art that the disclosed principles are not limited to digital cameras and can be used in any device performing image processing, including television, a video device, a viewfinder, or the like.

Figure 2A:
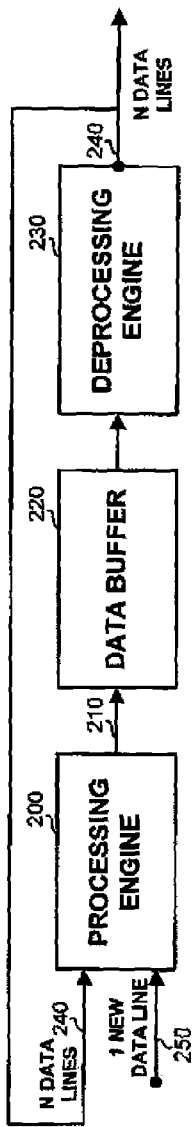
FIG. 2A is a schematic illustration of the flow within a preferred embodiment of a method of the disclosure.

Referring now to FIG. 2A, showing a schematic illustration of the data flow within the method of the disclosure. The method is suitable for any processing that utilizes a block of pixels comprising pixels of a number of adjacent lines. The method is particularly efficient when processing involves compression of the data. Block processing engine 200, designed to process N data lines, such as a JPEG engine, a demosaicing engine or the like receives one new data line 250 from a sensor of the digital camera, and N other data lines 240. Before N lines are accumulated, the missing lines are assumed to be identical to the first received line, or initiated to a predetermined value. The recent N−1 out of N data lines 240, together with line 250 are processed by engine 200. Processing results 210, such as the DCT coefficients if engine 200 is a JPEG engine, reconstructed ROB lines from the raw image data if the engine is a demosaicing, or the like, are stored in data buffer 220. The data is then transferred to deprocessing engine 230, which performs the inverse operation to processing engine 200, such as a compressed image lines transferred to JPEG decompressor, or re-reconstructed raw image data from the process inverse to demosaicing passed to a mosaicing engine. Engine 230 deprocesses the data and retrieves lines 240, which are identical to the N compressed lines in the case of lossless processing, or an estimation thereof otherwise. Lines 240 are output to storage, display device, or any other destination. In addition, lines 240 are fed back to engine 200, which abandons the most recent line and uses a further new line 250 for block processing.

Figure 2B:
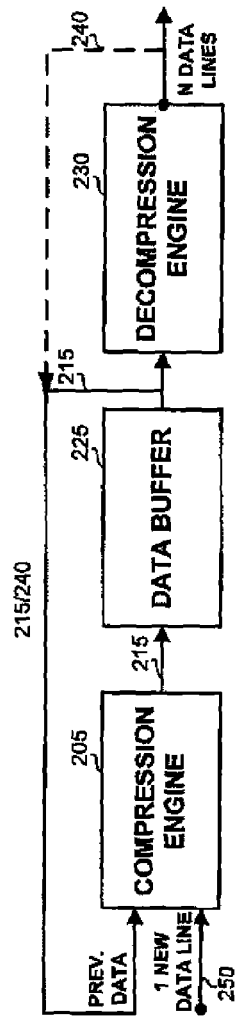
FIG. 2B is a schematic illustration of the flow within another preferred embodiment of the method of the disclosure.

Referring now to FIG. 2B, showing a preferred enhancement of the flow of FIG. 2A for some types of processing. The flow shown in FIG. 2B can be used for cases in which the processing engine can use its own results from a previous round, for example in JPEG compression. In FIG. 2B, processing engine 205 is an engine adapted to use its own results. For example, engine 205 is optionally a compression engine, such as a JPEG engine that can use its own results. Thus, engine 205 receives and processes its own previous results 215 and a newly acquired data line 250, and stores the output such as DCT and DST coefficients 215 in data buffer 225. Engine 230 deprocesses the data and retrieves N lines 240, which are identical to the N recently received lines in the case of lossless processing, or an estimation thereof otherwise. Lines 240 are output to storage, display device, or any other destination. In some alternative embodiments, lines 240 may also be fed back to, and used by compression engine 205. Thus, compression engine 205 can be configured to use raw data, estimation thereof, previous results or alternate between the above.

Before N lines are accumulated, the non-available lines can be assumed to be equal to any of the available lines, or they can be assumed to contain all zeros or any other predetermined value.

Figure 2C:
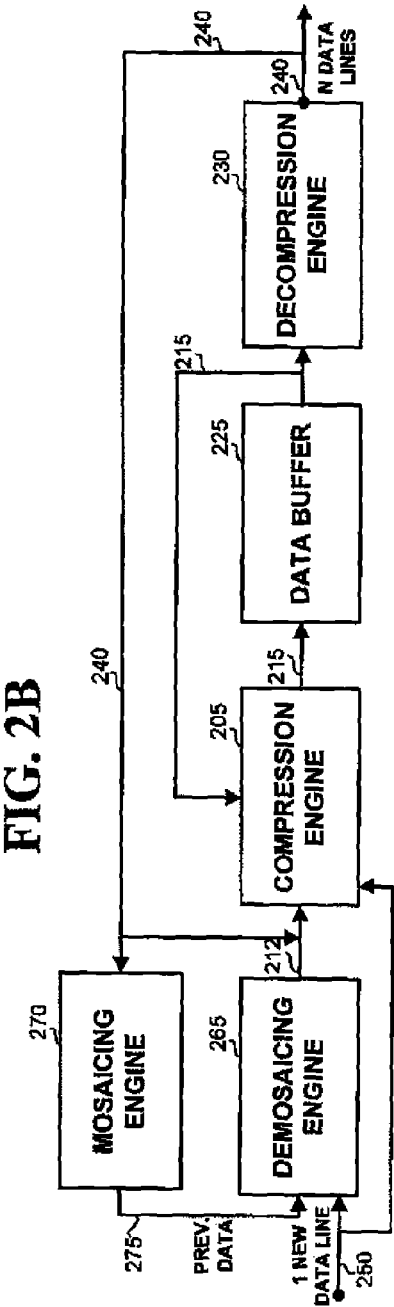
FIG. 2C is a schematic illustration of the flow within another preferred embodiment of the method of the disclosure.

Referring now to FIG. 2C, showing a preferred enhancement of the flow of FIG. 2B for processing in which the raw image data undergoes demosaicing followed by compression. Similarly to FIG. 2B, the flow shown in FIG. 2C can be used for cases in which the processing engine can use its own results from a previous round, for example in JPEG compression. In FIG. 2C, raw data 250 is fed into a processing engine such as demosaicing engine 265, after which the demosaiced data is transferred to processing engine 205. Engine 205 is an engine adapted to use its own results as well as original or demosaiced data lines. For example, engine 205 is optionally a compression engine, such as a JPEG engine that can use its own results or data lines. Thus, engine 205 receives and processes demosaiced data 212 and a newly acquired data line 250, and stores the output such as DCT and DST coefficients 215 in data buffer 225. Engine 230 deprocesses the data and retrieves N lines 240, which are identical to the N demosaiced data lines in the case of lossless processing, or an estimation thereof otherwise. Lines 240 are output to storage, display device, or any other destination. In some alternative embodiments, lines 240 may also be fed back to and used by compression engine 205. Data lines 240 are optionally transferred to engine 270 performing the reverse operation to engine 265, in the non-limiting example a mosaicing engine. Mosaicing engine 270 retrieves an estimation 275 of the previous mosaiced data from lines 240, and feeds the estimation into engine 265.

Thus, engine 265 and engine 205 which operate on blocks of pixels, can receive one new data line and estimation of previous data lines obtained by reversing their own operations. Alternatively, engine 265 or engine 205 can operate on a combination of their previous results and one new raw data line.

Before N lines are accumulated, the non-available lines can be assumed to be equal to any of the available lines, or they can be assumed to contain all zeros or any other predetermined value.

It will be appreciated by a person skilled in the art that the flow of FIG. 2A is applicable to all sorts of processing engines, including JPEG, while the flow of FIG. 2B is applicable only to engines that can use their own results, such as a JPEG compression engine operating as detailed in association with FIG. 3 below.

Figure 3:
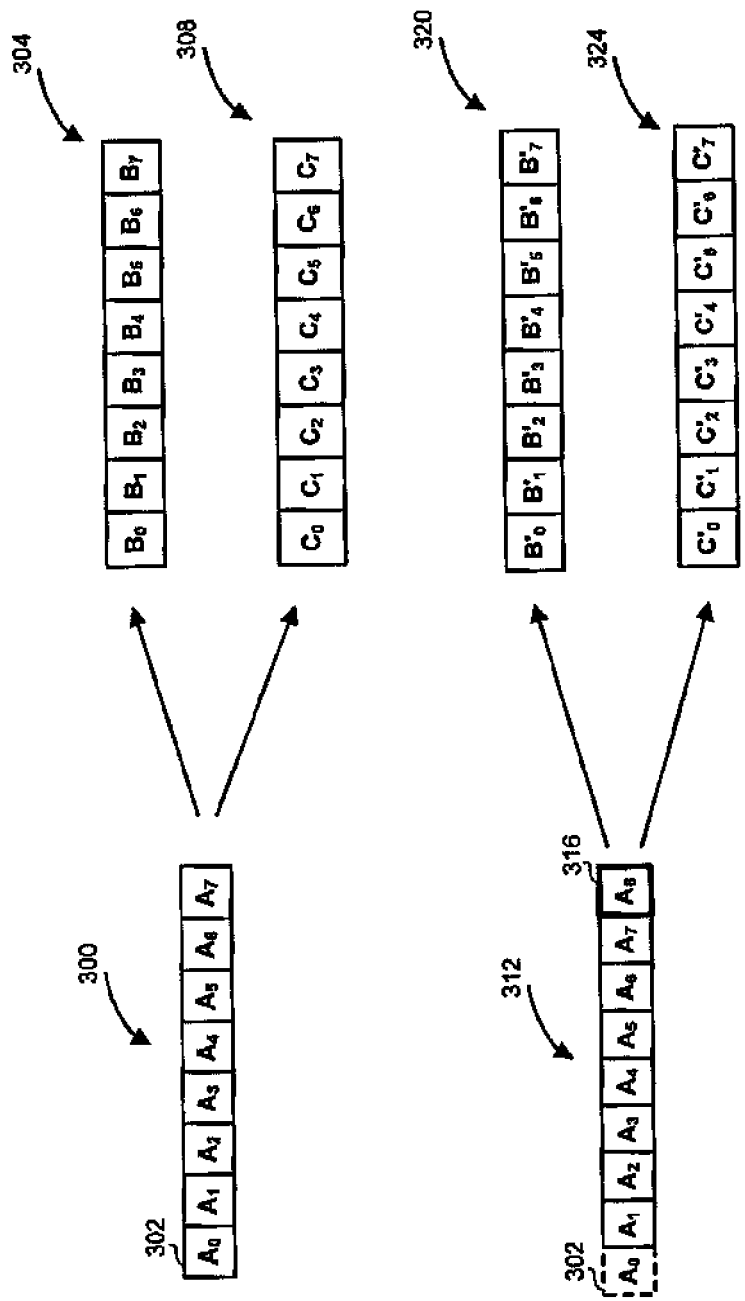
FIG. 3 is a schematic illustration of the calculation for JPEG compression, in accordance with a method of the disclosure.

Referring now to FIG. 3, showing an exemplary schematic flow of a preferred implementation of a JPEG engine which is adapted to use its own results. JPEG compression is dimensionally separable, i.e. the compression can be done separately for X and Y dimensions. Within the example, an eight pixel line 300, comprising pixels $A_0$ to $A_7$ is received. Line 300 is compressed, resulting in DCT coefficient line 304, comprising coefficients $B_0$ to $B_7$, and DST coefficient 308, comprising coefficients $C_0$ to $C_7$.

When a new pixel $A_8$ (316) is received, a new eight pixel line 312 is obtained, comprising pixels $A_1$ to $A_8$. The coefficients corresponding to line 312 are denoted by DCT coefficients 320 comprising coefficients $B'_0$ to $B'_7$ and DST coefficient 324, comprising coefficients $C'_0$ to $C'_7$.

Coefficients 320 and 324 can be determined as follows:
For each p, $0 \leq p \leq 7$ $$B'_p = K_{2C} B_p + K_{2S} C_p - \alpha_P (A_0 + (-1)^{p+1} A_8) \cos \frac{\pi}{16} p$$

$$C'_p = -K_{2S} B_p + K_{2C} C_p + \alpha_P (A_0 + (-1)^{p+1} A_8) \sin \frac{\pi}{16} p$$

wherein $$K_{2C} = \cos \frac{\pi}{8} p, \quad K_{2S} = \sin \frac{\pi}{8} p,$$

and $\alpha_p$ are the scaling coefficients used by JPEG compressors. Thus, coefficients $B'_0$ to $B'_7$ and $C'_0$ to $C'_7$ for the new line comprising pixels $A_1$ to $A_8$ are determined using coefficients $B_0$ to $B_7$ and $C_0$ to $C_7$ determined for the previous vector. It should be noted that outdated pixel $A_0$ is also used and should therefore be stored. $B'_0$ to $B'_7$ and $C'_0$ to $C'_7$ are determined from $B_0$ to $B_7$ and $C_0$ to $C_7$ by rotating them by $\pi/8 * p$ degrees, subtracting the outdated pixel $A_0$ (302) and adding the new pixel $A_8$ (316) values normalized. The mathematical derivation of the formulae for $B'_p$ and $C'_p$ is presented below.

The calculation is performed for each pixel of each line. Thus, processing an 8×3 block requires 64 times more calls than for ordinary 8×3 block JPEG compression, and involves also the determination of the DST coefficients. However, the overall calculation is much more efficient than ordinary JPEG compression since each iteration requires only a small number of computations, so the overall performance is not degraded.

A further advantage is that the DCT coefficients together with the DST coefficients may be used for direct motion estimation, enabling MPEG video compression, which is thus achieved without further computational requirements in motion estimation engine.

A further enhancement can be achieved by separating the captured image into distinct 8-line stripes, wherein each stripe is coded separately. Thus, when the first line of a strip is coded, the other lines are zero, so coding effort is significantly reduced, when coding the next line only two lines are non-zero, and so on, resulting in cutting the computational effort in half. Separating the image into stripes will also avoid dragging error further and further, and will force a reset every predetermined number of rows.

Mathematical proof for the formulae for determining $B'_p$ and $C'_p$ from $B_p$ and $C_p$: Ordinary JPEG coefficient determination is preferably done as follows:

$$1. \quad B_p = \alpha_p \sum_{m=0}^{7} A_m \cos \frac{\pi}{16} (2m+1) p$$

$$C_p = \alpha_p \sum_{m=0}^{7} A_m \sin \frac{\pi}{16} (2m+1) p$$

Therefore $$2. \quad B'_p = \alpha_p \sum_{m=1}^{8} A_m \cos \frac{\pi}{16} (2m-1) p$$

$$C'_p = \alpha_p \sum_{m=1}^{8} A_m \sin \frac{\pi}{16} (2m-1) p$$

$$3. \quad \tilde{B}_p = B_p - \alpha_p A_0 \cos \frac{\pi}{16} p$$
$$= \alpha_p \sum_{m=1}^{7} A_m \cos \frac{\pi}{16}(2m+1) p =$$
$$= \alpha_p \sum_{m=1}^{7} A_m \left( \cos \frac{\pi}{8} m p \cos \frac{\pi}{16} p - \sin \frac{\pi}{8} m p \sin \frac{\pi}{16} p \right) =$$
$$= \alpha_p \left( \cos \frac{\pi}{16} p \sum_{m=1}^{7} A_m \cos \frac{\pi}{8} m p - \sin \frac{\pi}{16} p \sum_{m=1}^{7} A_m \sin \frac{\pi}{8} m p \right)$$

$$\tilde{C}_p = C_p - \alpha_p A_0 \sin \frac{\pi}{16} p$$
$$= \alpha_p \sum_{m=1}^{7} A_m \sin \frac{\pi}{16}(2m+1) p =$$
$$= \alpha_p \sum_{m=1}^{7} A_m \left( \sin \frac{\pi}{8} m p \cos \frac{\pi}{16} p + \cos \frac{\pi}{8} m p \sin \frac{\pi}{16} p \right) =$$
$$= \alpha_p \left( \cos \frac{\pi}{16} p \sum_{m=1}^{7} A_m \sin \frac{\pi}{8} m p + \sin \frac{\pi}{16} p \sum_{m=1}^{7} A_m \cos \frac{\pi}{8} m p \right)$$

$$4. \quad \tilde{B}'_p = B'_p - \alpha_p A_8 \cos \frac{\pi}{16} 15 p$$
$$= \alpha_p \sum_{m=1}^{7} A_m \cos \frac{\pi}{16}(2m-1) p =$$
$$= \alpha_p \sum_{m=1}^{7} A_m \left( \cos \frac{\pi}{8} m p \cos \frac{\pi}{16} p + \sin \frac{\pi}{8} m p \sin \frac{\pi}{16} p \right) =$$
$$= \alpha_p \left( \cos \frac{\pi}{16} p \sum_{m=1}^{7} A_m \cos \frac{\pi}{8} m p + \sin \frac{\pi}{16} p \sum_{m=1}^{7} A_m \sin \frac{\pi}{8} m p \right)$$

$$\tilde{C}'_p = C'_p - \alpha_p A_8 \sin \frac{\pi}{16} 15 p$$
$$= \alpha_p \sum_{m=1}^{7} A_m \sin \frac{\pi}{16}(2m-1) p =$$
$$= \alpha_p \sum_{m=1}^{7} A_m \left( \sin \frac{\pi}{8} m p \cos \frac{\pi}{16} p - \cos \frac{\pi}{8} m p \sin \frac{\pi}{16} p \right) =$$
$$= \alpha_p \left( \cos \frac{\pi}{16} p \sum_{m=1}^{7} A_m \sin \frac{\pi}{8} m p - \sin \frac{\pi}{16} p \sum_{m=1}^{7} A_m \cos \frac{\pi}{8} m p \right)$$

5. Denote $$5. \quad K_C = \alpha_p \cos \frac{\pi}{16} p \quad C = \sum_{m=1}^{7} A_m \cos \frac{\pi}{8} m p$$

$$K_S = \alpha_p \sin \frac{\pi}{16} p \quad S = \sum_{m=1}^{7} A_m \sin \frac{\pi}{8} m p$$

$$6. \quad \tilde{B}_p = K_C \cdot C - K_S \cdot S$$

-continued $$\tilde{B}'_p = K_C \cdot C + K_S \cdot S$$

$$\tilde{C}_p = K_C \cdot S + K_S \cdot C$$

$$\tilde{C}'_p = K_C \cdot S - K_S \cdot C$$

$$\tilde{B}_p + \tilde{B}'_p = 2K_C \cdot C$$

$$\tilde{B}_p - \tilde{B}'_p = -2K_S \cdot S$$

$$\tilde{C}_p + \tilde{C}'_p = 2K_S \cdot S$$

$$\tilde{C}_p - \tilde{C}'_p = 2K_C \cdot C$$

$$C = \frac{\tilde{B}_p + \tilde{B}'_p}{2K_C}$$

$$S = \frac{\tilde{B}'_p - \tilde{B}_p}{2K_S}$$

$$\tilde{C}_p = \frac{K_C}{2K_S}(\tilde{B}'_p - \tilde{B}_p) + \frac{K_S}{2K_C}(\tilde{B}'_p + \tilde{B}_p)$$

$$S = \frac{\tilde{C}_p + \tilde{C}'_p}{2K_C}$$

$$C = \frac{\tilde{C}_p - \tilde{C}'_p}{2K_S}$$

$$\tilde{B}_p = \frac{K_C}{2K_S}(\tilde{C}_p - \tilde{C}'_p) - \frac{K_S}{2K_C}(\tilde{C}_p + \tilde{C}'_p)$$

7. $2\tilde{C}_p K_S K_C = K_C^2(\tilde{B}'_p - \tilde{B}_p) + K_S^2(\tilde{B}'_p + \tilde{B}_p)$ $$\tilde{B}'_p 2K_S K_C \tilde{C}_p + (K_C^2 - K_S^2)\tilde{B}_p$$

$$2\tilde{B}_p K_S K_C = K_C^2(\tilde{C}_p - \tilde{C}'_p) + K_S^2(\tilde{C}_p + \tilde{C}'_p)$$

$$\tilde{C}'_p = -2K_S K_C \tilde{B}_p + (K_C^2 - K_S^2)\tilde{C}_p$$

8. $\tilde{B}'_p = K_{2C}\tilde{B}_p + K_{2S}\tilde{C}_p$ $$\tilde{C}'_p = -K_{2S}\tilde{B}_p + K_{2S}\tilde{C}_p$$

9. $B'_p - \alpha_p A_8 \cos\frac{\pi}{16}15p = K_{2C}\left(B_p - \alpha_p A_0 \cos\frac{\pi}{16}p\right) +$ $$K_{2S}\left(C_p - \alpha_p A_0 \sin\frac{\pi}{16}p\right)$$

$$= K_{2C}B_p + K_{2S}C_p - \alpha_p A_0 \cos\frac{\pi}{16}p$$

$$C'_p - \alpha_p A_8 \sin\frac{\pi}{16}15p = -K_{2S}\left(B_p - \alpha_p A_0 \cos\frac{\pi}{16}p\right) +$$

$$K_{2C}\left(C_p - \alpha_p A_0 \sin\frac{\pi}{16}p\right)$$

$$= -K_{2S}B_p + K_{2C}C_p + \alpha_p A_0 \sin\frac{\pi}{16}p$$

10. $B_p = K_{2C}B_p + K_{2S}C_p - \alpha_p(A_0 + (-1)^{p+1}A_8)\cos\frac{\pi}{16}p$ $$C_p = -K_{2S}B_p + K_{2C}C_p + \alpha_p(A_0 + (-1)^{p+1}A_8)\sin\frac{\pi}{16}p$$

Figure 4:
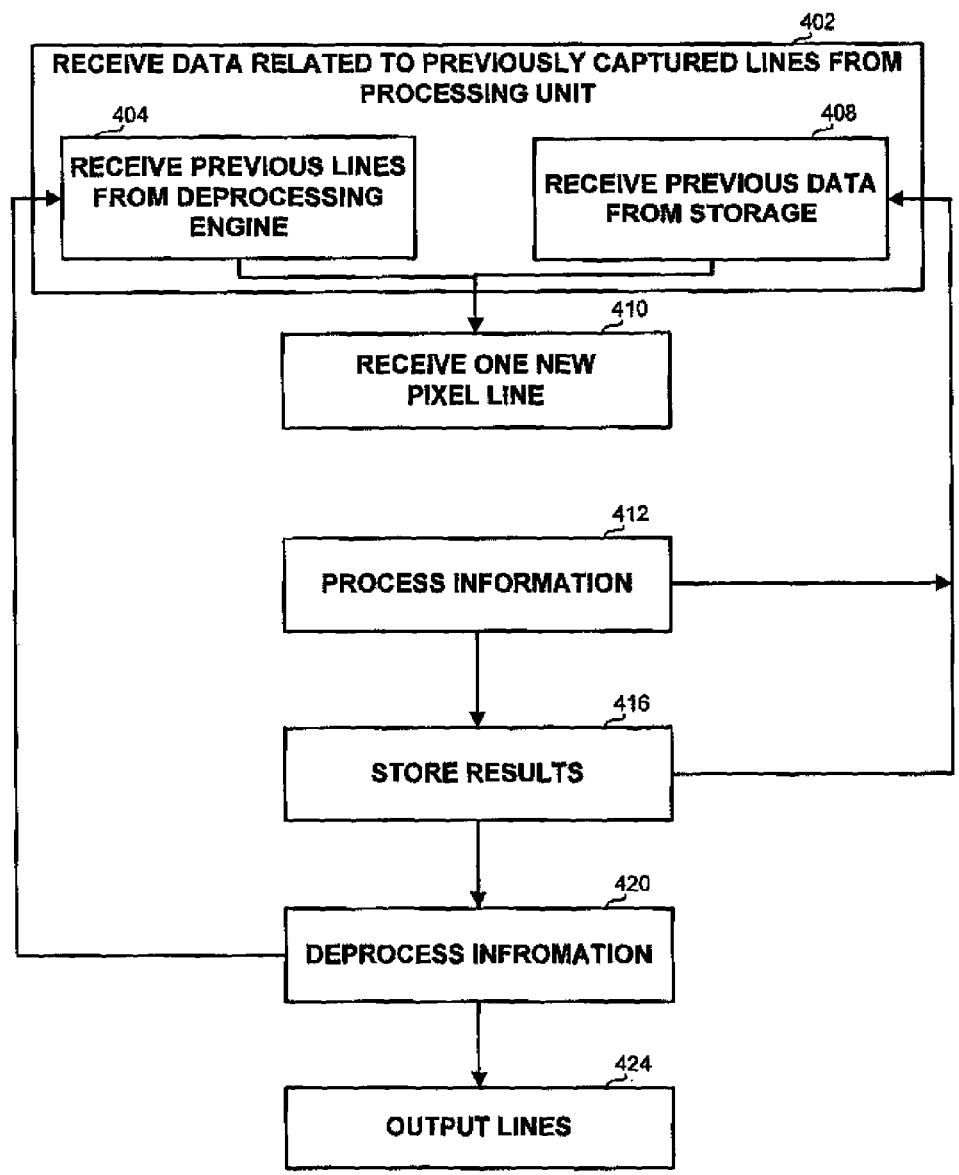
FIG. 4 is a flowchart of the main steps in a preferred embodiment of a method of the disclosure.

Referring now to FIG. 4, showing a flowchart of the main steps in preferred embodiments of the methods of the disclosure. On step 402, data related to at least N−1 previously captured image lines is received from an engine, such as a compressing engine or from a decompressing engine, the processing engine executed by coprocessor 140 of FIG. 1. Step 402 comprises step 404, in which a reconstruction of previously captured lines, or estimation thereof, are received by a processing engine from a deprocessing engine, unlike traditional systems in which these lines are also received from delay lines. Alternatively to step 404, on step 408, data related to the previously captured lines, such as processing results, is received by the processing engine from the processing engine itself or from a storage unit in which the data was stored. It will be appreciated that the data optionally comprises results related to the previously captured image lines, or to an estimation of the previously captured image line, in case this is a further iteration of the data. On step 410 a sequence of one or more pixels, such as a single pixel-line or part thereof is received from a sensor of the digital camera. On step 412 a processing engine processes the newly captured line together with the reconstructed lines or with the data to process a pixel block. The block processing results are optionally fed back and execution optionally returns to step 408. On step 416 the block processing results are stored, and optionally also fed back returning execution to step 408 for processing the next line. On step 420 the block processing results are deprocessed by a deprocessing engine to reconstruct the originally captured lines or estimation thereof, depending on the processing type. A lossless processing will yield the lines as captured, while a lossy processing will yield an estimation of the original lines. The reconstructed lines or estimation are optionally fed back to step 404, and the process continues for the next line. In addition, the reconstructed lines or estimations are output on step 424 to any required usage, such as display, storage, further processing, or the like. Errors obtained by using the disclosed methods are sometimes of known types, such as vertical lines appearing on the image, and can therefore be detected and corrected using image processing techniques for error detection and error correction.

It will be appreciated that steps 404 and 408 are alternative to each other. It will be further appreciated that if step 404 takes place, lines will be fed back after deprocessing step 420, while if step 408 takes place processing results will be fed back after processing or after storage. However, the same processing engine can be adapted to utilize interchangeably a pixel block calculation as in traditional systems, using the originally captured pixel values, retrieved pixel values or estimation thereof, and the method described in association with FIG. 3 above or any other method for utilizing results of processing a previous block for processing an updated block.

It will be appreciated that the disclosed methods are preferably implemented as one or more interconnected units of computer instructions, performed by processor 140 of FIG. 1. Alternatively, they can be performed by one or more dedicated processors such as digital signal processor (DSP) or microcontrollers or can be implemented as hardware or configurable hardware such as field programmable gate array (FPGA) or application specific integrated circuit (ASIC).

The disclosed method and devices enable the performance of block-processing of processing without using delay lines or external memory, thus reducing the volume of on-chip memory and hence the size and cost of cameras, while maintaining the processing quality and real-time performance. The methods and camera retrieve previously captured lines by performing the inverse processing and providing the reconstructed line to the processing engine. Alternatively, the processing engine receives the data resulting by processing the lines, and uses the data for processing an image comprising a further line.

It will be appreciated by a person skilled in the art that multiple variations and options can be designed along the guidelines of the disclosed method. It will be appreciated that the disclosed method can be used for multiple signal types, including audio, video, multi-dimensional signals, and others and for any type of invertible multi-line processing, such as all types of compression, Demosaicing, convolutions and filters and other types of image processing involving pixel neighborhoods.

It will be further appreciated that the disclosed method and apparatus can alternatively be used for reducing the number of delay lines, instead of eliminating them altogether. Using fewer delay lines than the number of lines in a processed block implies using the available data lines, and retrieving the lines necessary for complementing the required number of lines in a block from the previous lines. Using some delay lines instead of none may suppress error spreading and smooth the resulting image. The number of delay lines used can be configurable and change according to the image type, imaging conditions, processing requirements, processing speed requirements, and other factors.

It will also be appreciated by a person skilled in the art that the disclosed methods and apparatus are not limited to digital cameras and can be used in any device performing image processing, including television, a video device, a viewfinder, or the like.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step of component to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A method for processing a pixel block, comprising:
using a processor to perform the following:
receiving data related to at least one previously captured image line, the data differing from the at least one previously captured image line;
receiving at least one captured pixel, the at least one captured pixel belonging to at least one captured image line; and
processing the at least one captured pixel and the data related to the at least one previously captured image line to obtain a processed block result, wherein the processing comprises performing JPEG compression, and wherein JPEG coefficients are determined by rotating previous JPEG coefficients, subtracting a normalized value of an outdated pixel, and adding a normalized value of the at least one captured pixel.

2. The method of claim 1 wherein the pixel block comprises a rectangular pixel block.

3. The method of claim 1 further comprising deprocessing the processed block results to obtain at least one image line.

4. The method of claim 3 wherein the deprocessing comprises performing one or more of the following: JPEG decompression; JPEG 2000 decompression; wavelet decompression; MPEG decompression; and mosaicing.

5. The method of claim 1 wherein the data related to the at least one previously captured image line is a reconstruction of the at least one previously captured image line.

6. The method of claim 1 wherein the data related to the at least one previously captured image line is an estimated reconstruction of the at least one previously captured image line.

7. The method of claim 1 wherein the data related to the at least one previously captured image line comprises a block processing result of an estimation of the at least one previously captured image line.

8. The method of claim 1 further comprising storing the block processing results.

9. The method of claim 1 further comprising correcting an error in the processed block result.

10. The method of claim 1 wherein the processing comprises performing one or more of the following: JPEG compression; JPEG 2000 compression; wavelet compression; MPEG compression; and demosaicing.

11. The method of claim 1 wherein the method is performed in an image processing device.

12. The method of claim 1 wherein the method is performed in a digital camera.

13. A method for processing a pixel block using a reduced number of delay lines, comprising:
using a processor to perform the following:
receiving data related to previously captured at least one image line;
receiving at least one captured pixel, the at least one captured pixel belonging to a single captured image line; and
processing the at least one captured pixel and the data related to the previously captured at least one image line to obtain a processed block result, wherein the processing comprises performing JPEG compression, and wherein JPEG coefficients are determined by rotating previous JPEG coefficients, subtracting a normalized value of an outdated pixel, and adding a normalized value of the at least one captured pixel.

14. An image processing device for processing a pixel block, the device comprising:
a memory unit comprising a delay line that stores at least one image line;
a processor that executes a processing engine that processes a pixel block comprising the at least one image line, from the delay line and from data related to at least one previously captured image line, to obtain a processed block result, wherein the processing engine performs JPEG compression, and wherein JPEG coefficients are determined by rotating previous JPEG coefficients, subtracting a normalized value of an outdated pixel and adding a normalized value of the at least one captured pixel.

15. The image processing device of claim 14 wherein the pixel block comprises a rectangular pixel block.

16. The image processing device of claim 14 wherein the processor further executes a deprocessing engine that deprocesses the processed block results to obtain an estimation to the at least one previously captured image line.

17. The image processing device of claim 16 wherein the deprocessing engine performs one or more of the following: JPEG decompression; JPEG 2000 decompression; wavelet decompression; MPEG decompression; and mosaicing.

18. The image processing device of claim 14 wherein the data related to previously captured at least one image line is a reconstruction of the at least one image line.

19. The image processing device of claim 14 wherein the data related to previously captured at least one image line is an estimated reconstruction of the at least one image line.

20. The image processing device of claim 14 wherein the data related to the previously captured at least one image line comprises a block processing result of an estimation of the at least one previously captured image line.

21. The image processing device of claim 14 further comprising a storage device that stores the block processing results.

22. The image processing device of claim 14 wherein the processor further executes error detection and correction in the at least one image line.

23. The image processing device of claim 14 wherein the processing engine performs one or more of the following:

JPEG compression; JPEG 2000 compression; wavelet compression; MPEG compression; and demosaicing.

24. A non-transitory computer readable storage medium containing a set of computer instructions the set of computer instructions comprising:
   receiving data related to at least one previously captured image line, the data differing from the previously captured at least one image line;
   receiving at least one captured pixel, the at least one captured pixel belonging to at least one captured image lines; and
   processing the at least one captured pixel and the data related to the at least one previously captured image line to obtain a processed block result, wherein the processing comprises performing JPEG compression, and wherein JPEG coefficients are determined by rotating previous JPEG coefficients, subtracting a normalized value of an outdated pixel, and adding a normalized value of the at least one captured pixel.

* * * * *